Jan. 25, 1966 J. B. JAMES 3,231,874

DATA PROCESSING APPARATUS

Filed Feb. 16, 1962 2 Sheets-Sheet 1

INVENTOR
JOHN BERNARD JAMES

BY Hane and Nydick

ATTORNEYS

INVENTOR
JOHN BERNARD JAMES
BY
Hane and Nydick
ATTORNEYS 3,231,874
Patented Jan. 25, 1966

3,231,874
DATA PROCESSING APPARATUS

John Bernard James, Stevenage, Hertfordshire, England, assignor to International Computers and Tabulators Limited

Filed Feb. 16, 1962, Ser. No. 173,661
Claims priority, application Great Britain, Mar. 23, 1961, 10,659/61
6 Claims. (Cl. 340—174)

Figures 1, 2, 3:
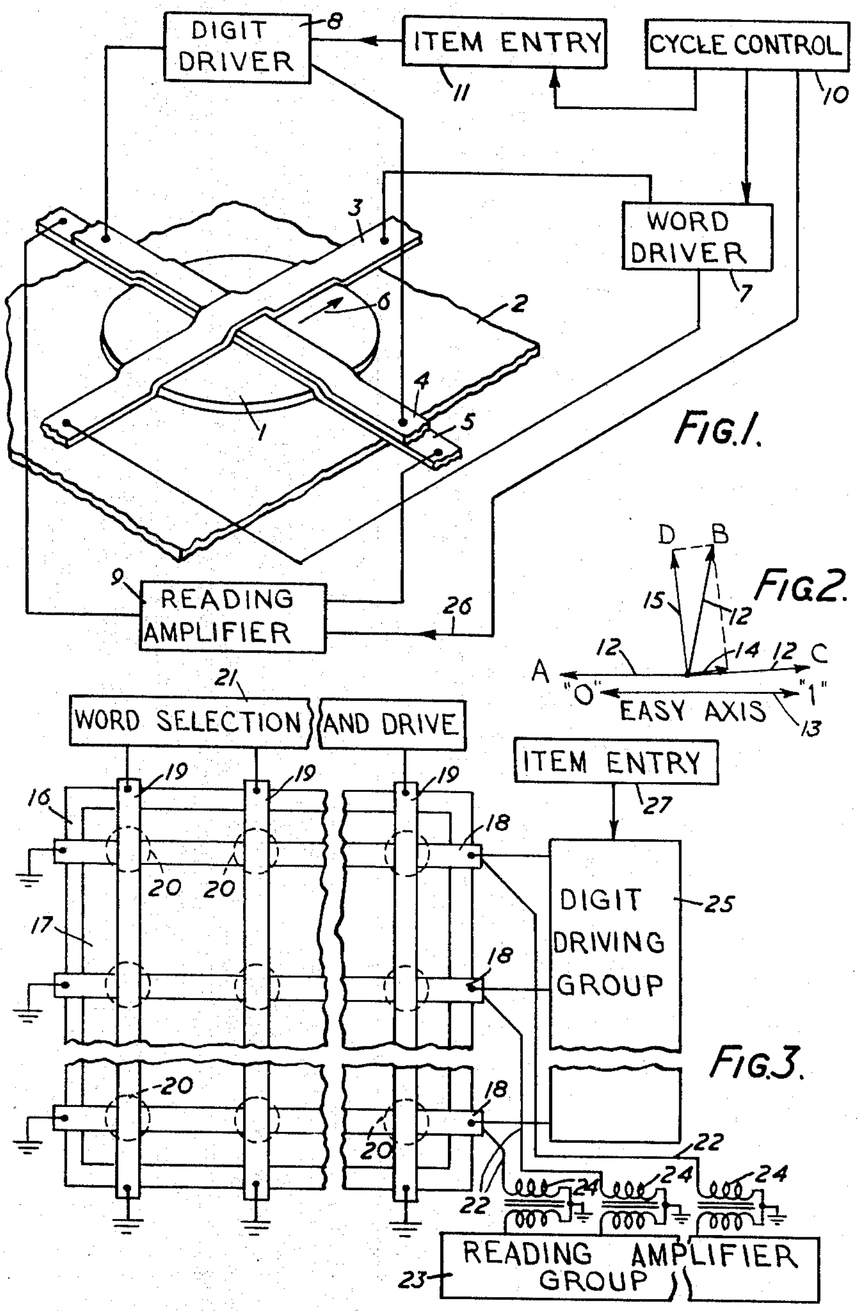

The present invention relates to information storage apparatus employing magnetic film.

Information storage apparatus has previously been proposed in which thin anisotropic magnetic films are used, the films being supported on plate-like substrates. These films exhibit single domain properties and have a so-called easy axis of magnetization along which the magnetization vector is aligned in the absence of an applied magnetic field. The films also have a hard axis of magnetization which is perpendicular to the easy axis.

An information storage element using a film of this kind has two stable magnetic states and may be used for storing data items expressible according to binary notation. The element may be said to be in a binary zero state (that is, a state in which it is storing an item of data corresponding to the binary digit zero) when the magnetization vector is aligned with the easy axis in one direction and, similarly, the element may be said to be in a binary one state when the magnetization vector is aligned with the easy axis in the opposite direction. The element is switchable from one state to the other predominantly by rotation of the magnetization vector under the influence of a suitable applied magnetic field.

The magnetic field for controlling the rotation of the vector is usually applied by the energization by suitable driving currents of driving conductors lying across the face of the film and coupled therewith. A further conductor may also be coupled to the film and an output current is induced into this conductor is response to rotation of the magnetization vector to provide an indication of the stored data item.

In prior storage apparatus the switching field applied to the storage elements has been produced by the selective and concurrent energization of two or more driving conductors and the effective speed of operation has been limited by the number and relative timing of the selection operations required to establish a composite magnetic field.

It is an object of the present invention to improve the speed of operation of information storage apparatus employing storage elements employing thin magnetic films switched by a composite magnetic field.

It is a further object of the invention to simplify the operation of an information storage element employing a thin magnetic film.

According to one aspect of the present invention, information storage apparatus includes a data storage element having a thin magnetic storage film possessing single domain properties switchable to store an item of data according to binary code notation between two opposite stable magnetic states, the magnetization vector of the film being aligned substantially along the easy axis of the film in one direction when the film is in one of said stable states corresponding to an item of one binary significance and in the opposite direction when the film is in the other of said stable states corresponding to an item of opposite binary significance, means for applying a word magnetic field acting in a direction substantially perpendicular to the easy axis to the film at each of a number of successive periods at each of which a data item is to be stored and means for changing a digit magnetic field applied in a direction substantially parallel to the easy axis to the film from a first value corresponding to an item of one binary significance to a second value corresponding to an item of opposite binary significance only if the binary significance of the item to be stored at the current period differs from the binary significance of the item stored at the preceding period of the succession. The storage apparatus may be cyclically operated, each operating cycle including a reading phase followed by a writing phase and the magnetic fields may be derived by the application of driving currents to conductors aligned respectively substantially parallel with and perpendicular to the easy axis and the word drive current may then be large with respect to the digit drive current. Reading out of the stored item from an element may then be accomplished by using a further pick-up conductor aligned with the digit drive conductor and connected to a reading amplifier.

According to another aspect of the present invention, information storage apparatus includes a plurality of thin magnetic film storage elements arranged in matrix formation of rows and columns on a common supporting substrate, each element possessing single domain properties and being switchable to store an item of data according to binary code notation between two opposite stable magnetic states, the magnetization vector of the film being aligned substantially along the easy axis of the film in one direction when an element is switched to a stable state corresponding to an item of one binary significance and in the other direction when the element is switched to the other stable state corresponding to an item of opposite binary significance, a plurality of row conductors aligned substantially parallel with the easy axes of the elements each linked with all the elements of a row, word current driving means connected to the row conductors and operable to select a row conductor to be energized with a word drive current during each of a succession of writing periods, a plurality of column conductors aligned substantially parallel to the easy axes of the elements each linked with all the elements of a column, means for energizing said column conductors with a first or second value of digit drive current in accordance with the binary significance of digits to be stored in a row of elements and means for changing the value of digit drive current applied to each column conductor from one to the other of said first and second values only if the binary significance of the digit to be stored in a column during a writing period differs from the digit stored in the same column during the preceding writing period of the succession. The elements may be discrete areas of film or they may consist of areas of a continuous film defined by the interaction of magnetic fields produced at the intersections of the row and column conductors.

Figure 4A:
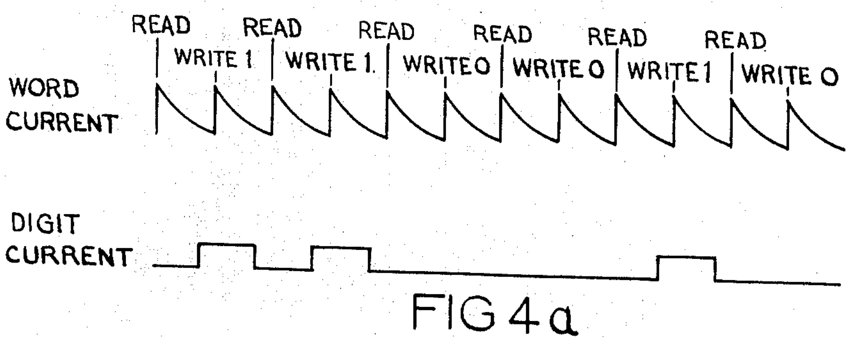
Figure 4B:
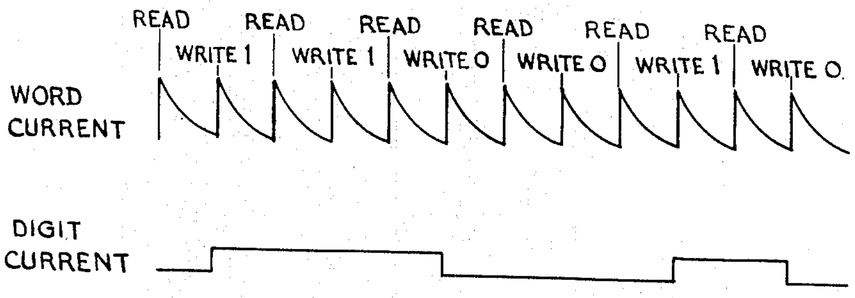

Apparatus embodying the present invention will now be described, by way of example, with reference to the accompanying drawing, in which, FIGURE 1 is a schematic representation of a thin film data storage element, FIGURE 2 is a vector diagram, FIGURE 3 shows diagrammatically a data storage arrangement having a matrix of data storage elements, FIGURE 4*a* is a schematic timing diagram showing the relationship between word and digit currents in a prior art storage system, and FIGURE 4*b* is a corresponding timing diagram for a storage system operating in accordance with the invention.

Referring now to FIGURE 1, a data item storage element includes an area of thin anisotropic magnetic film 1 switchable predominantly by domain rotation and supported in known manner upon a substrate 2. The substrate 2 may, for example, be of glass or of a non-magnetic electrically conducting material. A group of conductors 3, 4 are mounted in the conventional manner closely adjacent to the surface of the film 1 and, again as is usual, the conductors are electrically insulated from the film and from each other. Similarly, where an electrically conducting substrate is used, the conductors are also insulated from the substrate. Since the construction of thin film data storage elements is known per se, and the necessary insulation forms no part of the present invention it is omitted from the drawing for the sake of clarity.

Moreover, the relative dimensions of the substrate, the film area and the conductors have been distorted in the drawing for the sake of clarity in describing the operation of the device and it is to be understood that these parts of the device are constructed in the conventional manner. The easy axis of magnetization is indicated schematically in FIGURE 1 by arrow 6.

As in other devices of similar construction the conductors include a word drive conductor 3, a digit drive conductor 4 and a pick-up or sense conductor 5. Of these the word drive conductor 3 lies across the film in a direction substantially parallel to the easy axis of magnetization and the digit drive conductor is perpendicular to the word drive conductor. It will be appreciated that prior devices have required varying tolerances in the accuracy of alignment of the word drive conductor with the easy axis, some previously proposed modes of operation requiring that this conductor is aligned at a small angle with respect to the easy axis and that, in dependence upon the mode of operation to be used in conjunction with devies in accordance with the present invention similar considerations will apply. The pick-up conductor 5 is aligned in the same direction as the digit drive conductor and the digit drive conductor is then conveniently laid over the pick-up conductor in the conventional manner.

Under some circumstances a single conductor may be used both for digit driving and pick-up purposes. It will be apparent that the energization of the word drive conductor 3 by a suitable word current generator or word driver 7 creates a magnetic field such that the vector of magnetization of the film tends to rotate towards the hard axis which, as noted previously, is perpendicular to the easy axis. On the other hand, since the digit drive conductor 4 lies across the film in a direction perpendicular to the word drive conductor 3, it follows that the field produced by energization of the digit drive conductor 4 by current from a suitable digit driver 8 tends to align the magnetization vector in the direction of the easy axis. Thus it will be apparent that a composite magnetic field produced by the concurrent energization of both word and digit drive conductors 3 and 4 has components in the direction of both the hard and easy axes and that the degree of rotation of the magnetization vector is determined by the relative magnitudes of these two components.

It will be helpful at this point to consider the operation of prior storage devices in storing items of data expressed according to the binary code. In one mode of operation the storage of a binary zero is accomplished by the energization of the word drive conductor 3 only and the storage of a binary one requires the concurrent energization of both the word and digit drive conductors 3 and 4. (FIG. 4*a*). In this mode of operation the field produced by energization of the word drive conductor 3 has a value such that the magnetization vector is rotated to align in a direction lying in the quadrant between the hard axis and the binary zero representing direction along the easy axis. Hence, after collapse of the word drive field, the vector relaxes into the binary zero representing direction. The field produced by the concurrent energization of both drive conductors 3 and 4 on the other hand, causes the vector to assume a position in the quadrant lying between the hard axis and the binary one representing direction so that on the collapse of this composite field the vector relaxes to the binary one representing direction. Since the pick-up conductor 5 shown in FIGURE 1 lies parallel with the digit drive conductor 4, it will be realised that it is desirable to make the digit drive current as low as possible in order to avoid as far as possible the direct pick up of disturbances induced into the pick up conductor by mutual inductance. Consequently, it is preferred, in operating according to this mode that the word drive current has a large value relative to the digit drive curent so that the vecto rotates to within a few degrees of the hard axis and the digit current is then only sufficient to modify this rotation by the small amount necessary to turn the vector past the hard axis. It has previously been proposed to increase the tolerance on the word drive current, for example, by aligning the word drive conductor 3 at a small angle to the easy axis and correspondingly aligning the digit drive conductor at the same angle to the hard axis. The same effect may alternatively be obtained by aligning these conductors respectively with the easy and hard axes and providing a small biassing field by means of an auxiliary conductor system. Since both these methods have previously been proposed it is intended that the terms "substantially aligned" with an axis and "substantially perpendicular" to an axis shall be deemed to include the case where a conductor is aligned at the small angle with an axis in the manner referred to above.

Information storage devices of the kind described earlier are commonly cyclically operated in conjunction with, for example, data processing apparatus; a cycle of operation including a reading phase or period during which a stored item of data is read out, followed by a writing phase or period during which a new item of data is written or stored in the device. One known method of reading out the stored item from a device consists in energizing the word drive conductor 3 in the manner described in the preceding paragraph. The magnetization vector then rotates from the easy direction representing the stored binary digit to the position, previously specified, in the quadrant between the hard axis and the binary zero representing direction along the easy axis and, upon cessation of this word driving current, the vector relaxes to the binary zero direction. It will be appreciated that if the device was previously storing a binary one, reading out is destructive. It will also be seen that the word drive field alone is required to rotate the vector past the hard direction when the digit stored is a binary one. This may be achieved as in previously proposed devices, for example, by arranging that the word drive conductor lies at the small angle with respect to the easy axis of the film referred to above, or by providing the further biassing field to the film. A data storage device operating in this way is described, for example, in a paper entitled "A Compact Coincident—Current Memory" by A. V. Pohm and S. M. Rubens, published at page 120 of the Proceedings of the Eastern Joint Computer Conference held in New York on December 10–12, 1956.

The rotation of the magnetization vector in the way described during a reading phase induces an output signal in the pick-up conductor and this signal is applied to the input of a suitable reading amplifier 9 (FIGURE 1).

It will be appreciated, therefore, that the rotation of the vector during the writing phase also creates, to a greater or lesser extent, a corresponding disturbance at the input of the reading amplifier. Clearly it is desirable that this disturbance shall not interfere with the signal generated during a reading phase of the operating cycle. For this reason it is customary to delay the reading phase of a new cycle until the ditsurbance caused by the writing phase of the preceding cycle has died away. This is one of the factors limiting the rate at which cycles of operation may be performed by the storage device. Hence the effective operating speed of the device is less than otherwise would be the case. In this connection it will be realised that the required delay between writing and reading phases is increased if the disturbance is generated later in the writing phase. In prior devices it is generally true that the digit drive current applied during a writing phase overlaps the word driving current. This may be seen by considering the simple mode of operation referred to above. If the digit drive current applied for the writing of a binary digit one is removed before the word driving current, then the vector will rotate back towards the binary zero representing direction and will ultimately relax into this direction. Hence, it is usual to ensure that the digit driving current remains applied until the decay of the word drive current to a safe value permits its removal.

It follows, therefore, that the time of removal of the digit drive current during a writing phase in a large measure determines the delay period required before a reading phase may begin. At the same time it should be noted that the removal of the digit drive current itself gives rise to a disturbance at the reading amplifier input and the delay period must be long enough for this disturbance to die away.

In addition to this delay period, the time between switching off the word drive current and switching off the digit drive current is also important since the word drive current itself requires a finite time to decay to a safe value. This decay time is required because of the inductive nature of the word drive conductor circuits and these circuits therefore have a time constant proportional to the ratio L/R between their inductance and resistance. Hence, this time interval before the digit current can safely be switched off still further reduces the effective operating speed of the storage devices referred to above. This is particularly important, for example, where the word drive conductor selection circuits utilize the switching of bistable ferrite cores for deriving the driving currents.

Referring once again to FIGURE 1, the storage element according to the present invention is operated in a manner such that switching of the digit drive current at the end of the writing phase is avoided, thus avoiding the necessity for the delays referred to above. The cyclic operation of the storage element is controlled by a cycle timing control device 10, which produces timing pulses for controlling the operation of the drive current generators 7 and 8. The device 10 produces conventional cycle timing pulses which define the start of the reading and writing phases of the successive cycles of operation. Assuming the simple mode of operation previously described, these timing pulses are applied to the word driver 7 which is arranged to respond to each pulse to provide a word current pulse. Alternate control pulses from the cycle controller 10, which each define the start of a writing phase are used, in conjunction with an information entry gating unit 11 to condition the digit driver 8. The unit 11 consists of a conventional information item register which is set to one state if the item to be entered is a binary one and a second state if the item is a binary zero. Thus, if the item to be entered into the element during a writing phase differs from that last entered, the register switches to its opposite state. A logical gating network responds to the switching of the register to allow the next writing phase start pulse to pass to a bistable control trigger associated with the digit driver 8. An output from this trigger is effective only when the trigger is in a predetermined state to condition the digit driver 8 to produce a continuous drive current.

Thus assuming that the first digit to be stored is a binary one, the register in the unit 11 switches to the one state and the gating network allows the first write start pulse to pass to set the digit driver trigger to the predetermined state and the digit current is applied to the digit drive conductor 4. This digit current, although applied at the beginning of the writing phase is not switched off at the end of this phase, but continues throughout the next following reading phase (FIG. 4*b*). If the binary digit to be stored during the next following writing phase is again a one (that is, it is the same as that previously stored) the digit current remains undisturbed and is only changed as the result of the digit driver trigger being unset if the significance of the digit to be stored changes. Hence, any change in the digit driving current only takes place at the beginning of a writing phase and never in the interval between a writing and succeeding reading phase.

The vector movement which occurs in an element operated according to the present invention will now be considered with reference to FIGURE 2, using the simple mode of operation described earlier in which a digit drive current of fixed value is applied for writing a binary digit one and no digit drive current, which may be regarded as a digit drive current of zero value, is applied for writing a binary zero. Assume that the vector indicated by the arrow 12 is initially aligned in the easy direction corresponding to binary zero and that it is required to store a binary one. The easy direction is indicated by a line 13 which has arrow heads referenced "0" and "1" to indicate the binary 0 and 1 representing directions respectively. Thus, the magnetization vector is initially in the position referenced A. At the beginning of the writing phase a digit drive current of the fixed value is applied to the digit drive conductor and the required word drive current is applied to the word drive conductor. The magnetic fields produced by these drive currents are represented in FIGURE 2 by arrows 14 and 15 respectively. The resultant field causes the magnetization vector to rotate to a new position B lying in the quadrant between the hard axis and the easy direction corresponding to the binary one in the manner previously described. At the end of the writing phase the word current is removed and the vector relaxes into a position C determined by the field created by the digit drive current. It will be appreciated that the final direction of the vector depends upon the mode of operation of the element. For example, in the example shown, in order to ensure that the vector does not pass the hard axis from the easy direction under the influence of the word drive current alone, the word drive conductor 3 (FIGURE 1) is tilted at a small angle to the easy axis, as previously noted. In this case the digit drive field represented by arrow 14 (FIGURE 2), produced by the digit drive conductor which lies perpendicular to the word drive conductor, causes the final vector position to be at a very small angle to the easy direction. As previously noted however, the same effect may also be obtained using a word drive conductor aligned with the easy axis by providing a biasing field from a further conductor. If this further conductor is permanently energized then the final vector position will lie at the biasing angle to the easy axis. However, if the further conductor is energized only during the writing phase, the final vector position will lie along the easy axis. It will be apparent, however, that the divergence of the vector from the easy axis in any case is very small, and the principle of operation remains the same so that the vector is to be considered to take up a position substantially aligned with the easy axis in the binary one direction in any case.

During the next reading phase, again operating in the previously described mode, the vector 12 will again move to the position B under the influence of the fields 14 and 15 produced by energization of the word and digit drive conductors but will again relax into the position C substantially along the easy axis in the one direction at the end of the reading phase.

If a binary one is again to be stored during the next writing phase, the digit field 14 remains applied and the vector movement is similar to that during the preceding reading phase and the resultant vector direction is unchanged. If, however, the next digit to be stored is a binary zero, the digit drive current is reduced to zero value at the beginning of the writing phase with the result that the field 14 no longer affects the vector position and the vector then passes the hard axis to take up a position D, substantially aligned in the direction of arrow 15, in the quadrant between the hard axis and the easy axis in the binary zero direction, under the influence of the word drive field 15 alone. The vector will then relax to align substantially along the easy axis at position A at the end of the writing phase.

Summarising these conditions for operating the element it will be seen that the digit drive current, and consequently the digit drive field, is changed only if the significance of the binary digit to be stored during the current writing phase differs from that stored during the preceding writing phase and that this change of field takes place only at the beginning of the writing phase. Since there is no change of digit field between the writing phase and the next following reading phase there is no consequential disturbance at the input to the reading amplifier. The time delay required between writing and reading phases is thus correspondingly reduced with the result that the effective operating speed of the storage element is increased. It will be appreciated that, in order to prevent spurious outputs from the reading amplifier 9 (FIGURE 1) during the writing phases of the operating cycles, it is convenient to disable the amplifier at these times and to that end a control line 26 may be provided from the cycle control device 10.

Moreover, since there is no requirement for switching a digit driving current at the end of the writing phase the digit driving current switching apparatus may be simplified accordingly.

Storage apparatus for use in, for example, computers frequently requires that the storage elements are arranged in matrix formation, all the digits of a word being entered into and read out of the storage apparatus in parallel. FIGURE 3 shows, in diagrammatic form, an arrangement of storage elements for this purpose. A common substrate 16 supports a continuous thin film 17. Digit and word drive conductors 18 and 19, respectively, are applied in mutually perpendicular directions in the conventional manner to the face of the film 17. The storage elements are then defined by the magnetic fields produced by these conductors acting on the area of film indicated by the dotted circles 20 at the intersection of a digit drive conductor with a word drive conductor. It will be appreciated that the circular representation of an elementary area of film is intended merely as a diagrammatic indication of the position of the area and that the actual shape of the area is dependent upon the interaction of the word and digit driving fields. The word drive conductors 19 are connected at one end to a word selection and drive unit 21 of conventional form, the other ends of these conductors being shown earthed to indicate the necessary return circuit. The unit 21 selects a required word drive conductor 19 to be energised during an operating cycle in order to select the particular word position in the storage apparatus for reading or writing, and the unit 21 is in practice also controlled by timing signals in much the same way as described in connection with the word driver 7 of FIGURE 1. Thus, assuming the mode of operation previously described, the unit 21 energizes a selected word drive conductor 19 with current during the reading and writing phases of a cycle. Since the selected conductor is linked with all the elementary areas in a single column, only these areas are rendered capable of reading and writing during this cycle. Thus, each column includes the areas associated with the storage of a word.

The digit drive conductors 18 each link with a row of elementary areas and are connected to a group 25 of digit drivers, each similar to the driver 7 described with reference to FIGURE 1 and controlled in a similar manner by an item entry device 27. Thus, each elementary area of the selected column is operated in a similar manner to that described with reference to FIGURE 1 and the digit drive current applied to any of the conductors

18 is suffiicently small so that it does not affect the areas of an unselected column. Pick-up conductors, similar to the conductors 5 of FIGURE 1, may also be provided, underlying the digit drive conductors 18 (FIGURE 3) and provided with connections 22 to an associated group 23 of reading amplifiers, each corresponding to the amplifier 9 referred to in the description relating to FIGURE 1. It will be noted that the connections 22 are coupled to the reading amplifier group 23 by means of conventional transformers 24. This form of coupling, since it isolates the amplifiers of the group 23 from any D.C. present on the connections 22 allows the digit drive conductors 18 to be used as the pick-up conductors, the connections 22 in this case being connected to the conductors 18.

It will be apparent that each of the elements of FIGURE 2 are thus operated in the same manner as the element shown in FIGURE 1, and that as described earlier, the digit current is not changed at the end of the writing phase of a cycle, any change required taking place only at the beginning of the writing phase and then only if the items of data to be stored each differ from the item previously stored in the same row of the matrix. Thus, the increase in effective operating speed resulting from the avoidance of the delay time at the end of a writing phase is obtained whether the storage elements are considered singly or as a complete information storage arrangement.

It will be recalled that in the foregoing examples a simple mode of operation has been described which requires the digit drive current, and in consequence the digit drive field, to be changed from zero to a fixed value and vice versa in dependence upon whether the binary digit has significance one or zero. It will be appreciated that similar considerations apply in other more complex operating modes in which the digit drive currents for effecting storage of data items of opposite significance are each of finite magnitude and may be both of the same or opposite sign. For example, the digit current for storing a binary digit one may be of fixed positive magnitude and for storing a zero the current may be of negative sign or of different positive magnitude. The word currents for reading out and for writing may also be of opposite sign or magnitude. Thus, the term "value" as used herein in relation to the drive currents is to be deemed to include the sign as well as the magnitude of the current.

What is claimed is:

1. Information storage apparatus for storing a plurality of binary digits in succession, including an anisotropic magnetic thin film element having mutually perpendicular easy and hard axes of magnetisation and being switchable to a first state in which the magnetisation is aligned in one direction substantially along the easy axis to write a digit of first binary significance into the element, and to a second state in which the magnetisation is aligned in the opposite direction substantially along the easy axis to write a digit of second binary significance into the element; means operable, in a succession of write-read cycles in each of which a successive digit is written into the element in a writing phase and read-out from the element in a reading phase, to apply to the element a first magnetic field substantially aligned with the hard axis, said first field being applied for each writing phase and reapplied for each reading phase; and means operable to apply to said element, at the beginning of a write-read cycle, a second magnetic field substantially aligned with the easy axis to cause, in combination with said first field, a digit of one binary significance to be written into the element, and to maintain the application of said second field until the beginning of that next occurring write-read cycle in which a digit of the other binary significance is to be written into the element.

2. Information storage apparatus for storing a plurality of binary digits in succession, including an anisotropic magnetic thin film element having mutually perpendicular easy and hard axes of magnetisation and being switchable to a first state in which the magnetisation is aligned in one direction substantially along the easy axis to write a digit of first binary significance into the element, and to a second state in which the magnetisation is aligned in the opposite direction substantially along the easy axis to write a digit of second binary significance into the element; first and second conductors energisable respectively, to apply to the element first and second magnetic fields substantially aligned with the hard and easy axes, respectively; means to energise said first conductor by applying thereto a current pulse in each of a succession of alternate writing and reading periods, in which periods, respectively, a digit is written into said element and read-out from said element; and means operable to energise said second conductor at the beginning of a writing period to cause, in combination with the concurrent energisation of said first conductor, a digit of one binary significance to be written into the element, and operable to maintain the energisation of said second conductor until the beginning of that next occurring writing period in which a digit of the other binary significance is to be written into the element.

3. Information storage apparatus for storing a plurality of binary digits in succession, including an anisotropic magnetic thin film element having mutually perpendicular easy and hard axes of magnetisation and being switchable to a first state in which the magnetisation is aligned in one direction substantially along the easy axis to write a digit of first binary significance into the element, and to a second state in which the magnetisation is aligned in the opposite direction substantially along the easy axis to write a digit of second binary significance into the element; first and second conductors energisable, respectively, to apply to said element first and second magnetic fields substantially aligned with the hard and easy axes, respectively; first and second energising means operable to energise said first and second conductors, respectively; and operating means to operate said first energising means at each of a succession of alternate writing and reading periods, in which periods, respectively, a digit is written into said element and read-out from said element, and to operate said second energising means at the beginning of a writing period to cause, in combination with the concurrent energisation of said first conductor by said first energising means, a digit of one binary significance to be written into said element, and to maintain the operation of said second energising means until the beginning of that next occurring writing period in which a digit of the other binary significance is to be written into the element.

4. Apparatus according to claim 3, in which said operating means includes control means connected to said first energising means and operative to generate a succession of alternate writing period and reading period operating pulses for application to said first energising means; and gating means connected between said second energising means and said control means and resposive to a writing period operating pulse and to a change in the significance of the digit to be written into the element to generate a signal to operate said second energising means.

5. Apparatus according to claim 4, in which there are provided a pickup conductor coupled to said element; and read-out means connected to said pick-up conductor and operative only during a reading period, under control of said control means, to generate a signal representative of the significance of the digit read-out from said element.

6. Information storage apparatus, including a plurality of anisotropic magnetic thin film elements arranged in rows and columns, each element having mutually perpendicular easy and hard axes of magnetisation and being switchable selectively to two opposite states of magnetisation in which states, respectively, the magnetisation is aligned substantially parallel with the easy axis in one direction to represent a digit of first binary significance and in the opposite direction to represent a digit of second binary significance; a plurality of row conductors each coupled, respectively, to the elements of a row and aligned substantially parallel with the hard axes of the elements of that row; a plurality of column conductors each coupled, respectively, to the elements of a column and aligned substantially parallel with the easy axes of the elements of that column; means to select a column conductor and to energise the selected column conductor during a writing period; and means to select a row conductor and to apply to the selected row conductor an energising current which is effective, in combination with the energisation of said selected column conductor, to cause, during said writing period, a digit of one binary significance to be written into that element coupled to the selected row and column conductors, and which current is continuously applied to said selected row conductor throughout a subsequent succession of alternate reading and writing periods until that next occurring writing period in which a digit of the other binary significance is to be written into that said element.

References Cited by the Examiner

UNITED STATES PATENTS 3,058,099 10/1962 Williams ---------- 340—174

FOREIGN PATENTS 1,226,056 7/1960 France.

IRVING L. SRAGOW, *Primary Examiner.*

J. W. MOFFITT, *Assistant Examiner.*